(12) United States Patent
Manger et al.

(10) Patent No.: US 9,982,741 B2
(45) Date of Patent: May 29, 2018

(54) DAMPING VALVE DEVICE FOR A VIBRATION DAMPER

(71) Applicant: ZF FRIEDRICHSHAFEN AG

(72) Inventors: Thomas Manger, Wasserlosen (DE); Stefan Schmitt, Gochsheim (DE); Lukas Ruhmann, Memmelsdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days. days.

(21) Appl. No.: 15/308,195

(22) PCT Filed: Mar. 30, 2015

(86) PCT No.: PCT/EP2015/056836
§ 371 (c)(1),
(2) Date: Nov. 1, 2016

(87) PCT Pub. No.: WO2015/169507
PCT Pub. Date: Nov. 12, 2015

(65) Prior Publication Data
US 2017/0058988 A1   Mar. 2, 2017

(30) Foreign Application Priority Data
May 5, 2014   (DE) .................. 10 2014 208 367

(51) Int. Cl.
*F16F 9/46*   (2006.01)
*F16F 9/36*   (2006.01)
(Continued)

(52) U.S. Cl.
CPC ............... *F16F 9/463* (2013.01); *F16F 9/34* (2013.01); *F16F 9/369* (2013.01); *F16F 9/38* (2013.01); *F16F 2230/32* (2013.01)

(58) Field of Classification Search
CPC ...... F16F 9/463; F16F 9/38; F16F 9/34; F16F 9/369; F16F 2230/32
(Continued)

(56) References Cited

U.S. PATENT DOCUMENTS 5,398,787 A * 3/1995 Woessner ............... B60G 17/08
                                                                    188/266.6
5,518,089 A * 5/1996 Handke .................... F16F 9/465
                                                                    188/266.6
(Continued)

FOREIGN PATENT DOCUMENTS

DE   19722216   1/1998
EP   2103835    9/2009
FR   2805492    8/2001

*Primary Examiner* — Thomas J Williams
*Assistant Examiner* — Mariano Sy
(74) *Attorney, Agent, or Firm* — Cozen O'Connor

(57) ABSTRACT

A damping valve device (27), includes a damping valve housing (31) with a tube part (33) and an outer top housing part (35), wherein an intermediate housing wall (39) which is fixed with respect to the tube part (33) spatially separates a coil assembly (37) from a valve region (73), and the outer top housing part (35) forms a back iron body for the coil assembly (37), wherein an inner sleeve (69) together with a base (71) closes the valve region (73), wherein the outer top housing part (35) is a component part which is separate from the intermediate housing wall (39), and the inner sleeve (69) is connected to the intermediate housing wall (39) in a pressure-tight manner independent from the outer housing part (35), and wherein a protective cap (93) which is separate from the outer top housing part (35) covers the outer top housing part (35).

13 Claims, 4 Drawing Sheets

(51) Int. Cl.
*F16F 9/38* (2006.01)
*F16F 9/34* (2006.01)

(58) Field of Classification Search
USPC .............. 188/266.6, 322.13, 322.19, 322.2
See application file for complete search history.

(56) References Cited

U.S. PATENT DOCUMENTS

| | | | | |
|---|---|---|---|---|
| 5,651,433 A * | 7/1997 | Wirth | ...................... | F16F 9/325 |
| | | | | 188/266.6 |
| 6,000,508 A * | 12/1999 | Forster | ...................... | F16F 9/46 |
| | | | | 188/299.1 |
| 6,155,391 A * | 12/2000 | Kashiwagi | .............. | F16F 9/348 |
| | | | | 188/266.6 |
| 6,460,521 B1 * | 10/2002 | Modien | ............... | F16K 31/0655 |
| | | | | 123/568.21 |
| 8,413,774 B2 * | 4/2013 | Murakami | .............. | F16F 9/465 |
| | | | | 188/282.2 |
| 8,794,400 B2 * | 8/2014 | Nakadate | ................ | F16F 9/464 |
| | | | | 188/266.6 |
| 2012/0305349 A1 | 12/2012 | Murakami | | |
| 2012/0325603 A1 * | 12/2012 | Ootake | ................... | F16F 9/465 |
| | | | | 188/322.13 |

* cited by examiner

Prior Art

DAMPING VALVE DEVICE FOR A VIBRATION DAMPER

PRIORITY CLAIM

This is a U.S. national stage of application No. PCT/EP2015/056836, filed on Mar. 30, 2015. Priority is claimed on the following application(s): Country: Germany, Application No.: 10 2014 208 367.2, Filed: May 5, 2014; the content of which is/are incorporated herein by reference in its entirety.

FIELD OF THE INVENTION

The present invention is directed to a damping valve device which includes a damping valve housing with a tube part and an outer top housing part, wherein an intermediate housing wall which is fixed with respect to the tube part spatially separates a coil assembly from a valve region. The outer top housing part forms a back iron body for the coil assembly, and an inner sleeve together with a base closes the valve region.

BACKGROUND OF THE INVENTION

An adjustable damping valve device which is arranged on the outer side at an outer receptacle of a vibration damper is known from DE 197 22 216 A1. The outer receptacle has a radial tube connection piece for receiving a main stage valve which is controlled by a pre-stage valve by an electromagnetic actuator.

A coil and an armature of the actuator are arranged in a pot-shaped receptacle. An outer wall of the receptacle forms a back iron body for the armature and coil. A sleeve portion of a cover closes the circuit of the magnetic flux which exerts a displacement force on the armature.

An inside seal closes the tube connection piece from the environment, this tube connection piece being completely filled with damping medium. There is a positive engagement connection between the tube connection piece and the pot-shaped receptacle. In this way, no hydraulic compressive forces act on the coil. The coil is connected to a connection cable for the power supply via a radial window in the pot-shaped receptacle. This has two disadvantages. A defective power supply, e.g., cable breakage, leads to total failure of the damping valve device and vibration damper. Moreover, the coil can only be used together with the connection cable so that adjusting work at the two individual valves of the damping device during assembly is carried out only with special assembly coils. Accordingly, slight deviations can also occur when the electrical parameters of the assembly coil are not absolutely identical to those of the coil of the finished damping valve device.

As can be seen from FIG. 2 of DE 197 22 216 A1, the pot-shaped receptacle has a side opening for the cable connection through which moisture and dirt can penetrate into the damping valve device. Although the coil is protected by a sealing compound, moisture is generally a disadvantage while the moisture at least leads to unwelcome rust formation.

In a damping valve device known from DE 38 07 913 C1, a separate back iron cup and a cable connection separate from the coil are used.

It is thus an object of the present invention to minimize the problems known from the prior art.

SUMMARY OF THE INVENTION

According to the invention, this object is met in that the outer top housing part is a component part which is separate from the intermediate housing wall, and the inner sleeve is connected to the intermediate housing wall in a pressure-tight manner independent from the outer housing part, and wherein a protective cap which is separate from the outer top housing part covers the outer top housing part.

The inner component parts of the damping valve device can be better protected against external contamination by the protective cap. As a result of the component separation between coil assembly, outer housing part and protective cap, the coil assembly can be used more easily in a standardized manner. The shape of the outer protective cap is no longer dependent in detail on the coil assembly. Consequently, the coil assembly can also be installed and tested in the course of assembly without the protective cap.

In a further embodiment, the coil assembly has a contact which can be coupled with a counter-contact of the protective cap, and the protective cap is constructed with a power supply connection. Therefore, the protective cap not only fulfills a protective function but also forms an electric connection between a supply cable and the coil. In a standardized inner structure of the damping valve device, the protective cap can be constructed so as to be tailored to the consumer, e.g., to facilitate a desired cable run.

To simplify the installation process, the coil assembly has a positioning connection to the outer top housing part.

For example, the top housing part has means for preventing rotation relative to the protective cap.

The outer top housing part preferably has a retaining connection with the coil assembly. Accordingly, the coil assembly is oriented with respect to the protective cap so as to facilitate the installation of the protective cap, particularly for purposes of contact between the protective cap and the coil assembly.

The outer top housing part has at least one receiving opening for a fastening pin of the coil assembly. The fastening pin is part of a coil carrier and is preferably made of a plastic. As the result of simple heating and deformation, a connection capable of withstanding high stresses can be achieved between the coil assembly and the outer top housing part without foreign matter.

It is provided that the intermediate housing wall is connected to the tube part. Accordingly, the outer housing part need not take over any compressive forces proceeding from the valve region.

For purposes of a good contact closure between the coil assembly and the protective cap, a base of the protective cap is supported on the base of the inner sleeve. The contact and fastening region are located very close to one another, which is very conducive to the contact closure.

The protective cap is fixed at the base of the inner sleeve by a fastening device. Consequently, there is not only a support at the base, but also fixation. Warping of the protective cap is minimized.

It can be provided that the base of the protective cap has a passage through which the base of the inner sleeve projects, and the fastening device enters into a fixing connection with the base of the inner sleeve. The base of the inner sleeve is accordingly a fixing device comparable to a fixing bolt.

In order to protect the fixing connection against external influences, the fastening means has a hat-shaped cross section.

Optionally, a seal can be associated with the passage to completely close the protective cap.

It can be provided that the protective cap has a tube extension which axially overlaps the tube part. The overlapping impedes penetration of dirt and/or moisture into the damping valve device.

For particularly demanding applications, at least one seal can be arranged between an inner wall of the tube extension and the tube part.

BRIEF DESCRIPTION OF THE DRAWINGS

The invention will be described in more detail with reference to the following drawings in which.

DETAILED DESCRIPTION OF THE PRESENTLY PREFERRED EMBODIMENTS

Figure 1:
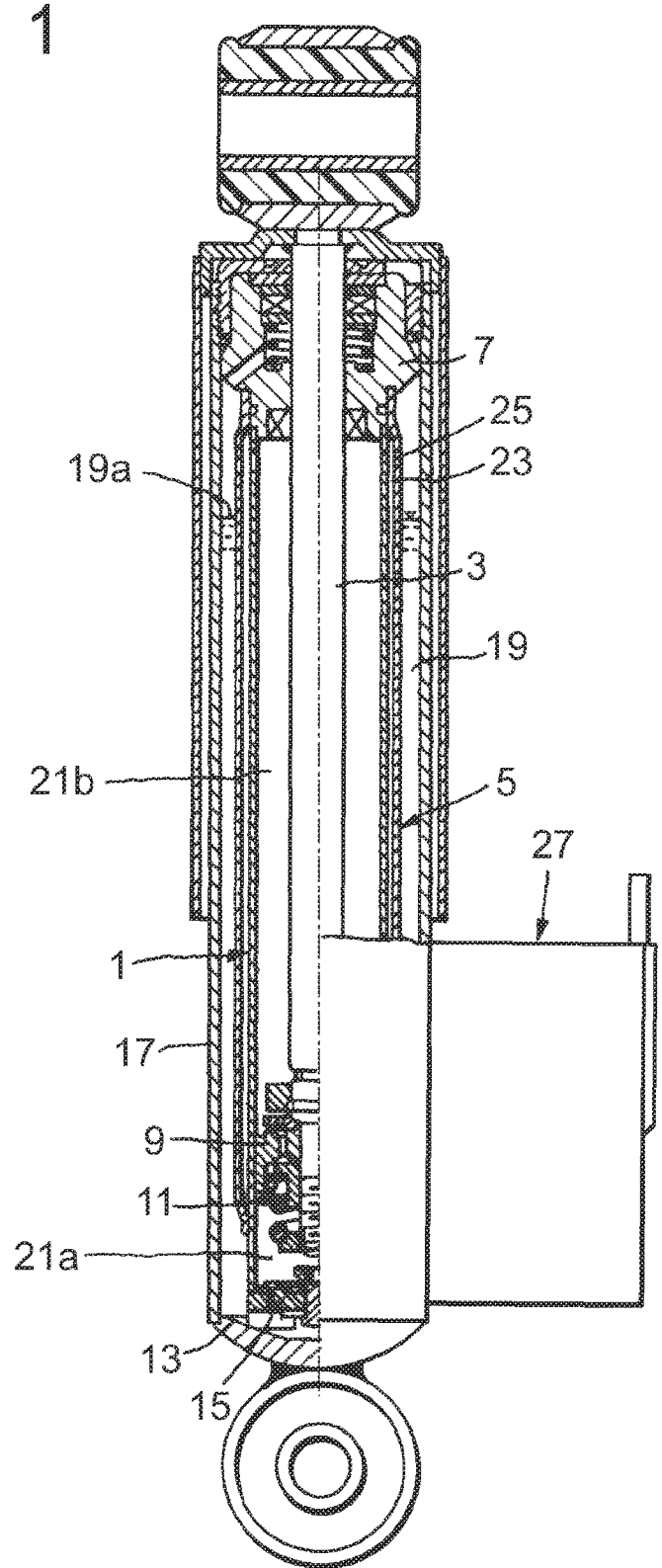
FIG. 1 is a schematic view of the position of a damping valve device in a prior art vibration damper.

In FIG. 1, a vibration damper has a cylinder 1 in which a piston rod 3 is arranged so as to be axially movable. A guiding and sealing unit 7 guides the piston rod 3 out of the upper end of the cylinder. A piston unit 9 with a piston valve arrangement 11 is fastened to the piston rod 3 inside the cylinder 1. The bottom end of the cylinder 1 is closed by a base plate 13 with a bottom valve arrangement 15. The cylinder 1 is enclosed by a reservoir tube 17. The reservoir tube 17 and an intermediate tube 5 form an annular space 19 presenting a compensation chamber. The space inside the cylinder 1 is divided by the piston unit 9 into a first working chamber 21a and a second working chamber 21b. The working chambers 21a and 21b are filled with damping fluid. The compensation chamber 19 is filled with liquid up to level 19a and, above that, with gas. A first line section, namely, a high-pressure partial section 23 which communicates with the second working chamber 21b via a bore 25 of cylinder 1 is formed inside the compensation chamber 19. Adjoining this high-pressure partial section is an adjustable damping valve device 27 which is fitted laterally to the reservoir tube 17. A second line section, namely, a low-pressure partial section, not shown, leads from the adjustable damping valve device 27 into the compensation chamber 19.

When the piston rod 3 moves upward out of the cylinder 1, the upper working chamber 21b becomes smaller. An overpressure builds up in the upper working chamber 21b, which overpressure can only be reduced through the piston valve arrangement 11 in the lower working chamber 21a as long as the adjustable damping valve 27 is closed. When the adjustable damping valve device 27 is opened, fluid flows simultaneously from the upper working chamber 21b through the high-pressure partial section 23 and the adjustable damping valve device 27 into the compensation chamber 19. Accordingly, when the piston rod 3 moves out, the damping characteristic of the vibration damper depends on the degree to which the adjustable damping valve device 27 is open or closed.

When the piston rod 3 moves into the cylinder 1, an overpressure forms in the lower working chamber 21a. Fluid can pass upward from the lower working chamber 21a through the piston valve arrangement 11 into the upper working chamber 21b.

The fluid displaced by the increasing piston rod volume within the cylinder 1 is expelled through the bottom valve arrangement 15 into the compensation chamber 19. An increasing pressure also occurs in the upper working chamber 21b because the flow resistance of the piston valve arrangement 11 is less than the flow resistance of the bottom valve arrangement 15. This increasing pressure can again flow through the high-pressure partial section 23 into the compensation space 19 when the damping valve device 27 is opened. This means that when the damping valve device 27 is opened the vibration damper also has a softer characteristic when moving in when the adjustable damping valve device 27 is open and a harder characteristic when the damping valve device 27 is closed, just as when the piston rod moves out. It should be noted that the flow direction through the high-pressure partial section 23 of the bypass is always the same regardless of whether the piston rod moves in or out.

Figure 2:
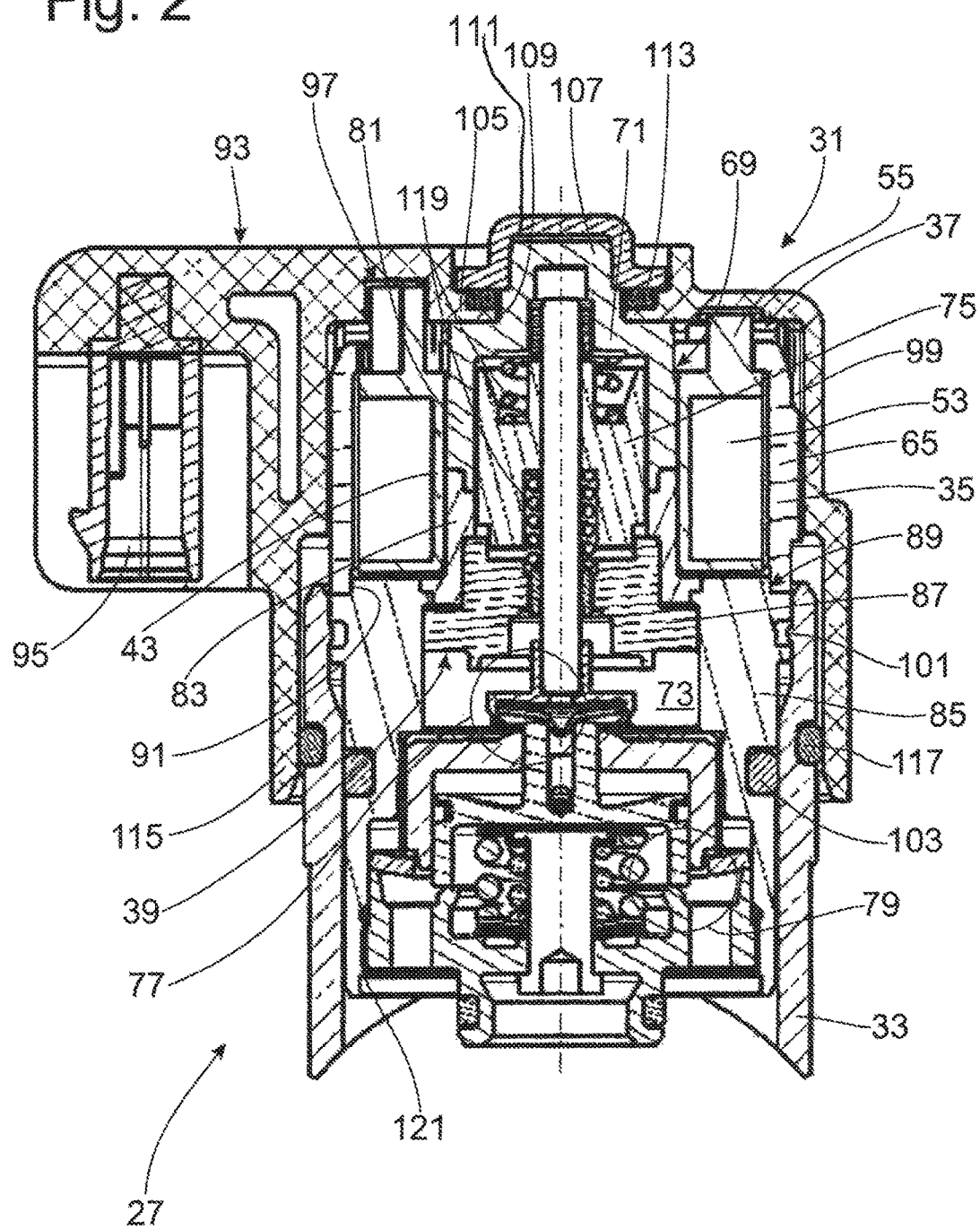
FIG. 2 is a sectional view of the damping valve device of the present invention.
Figure 4:
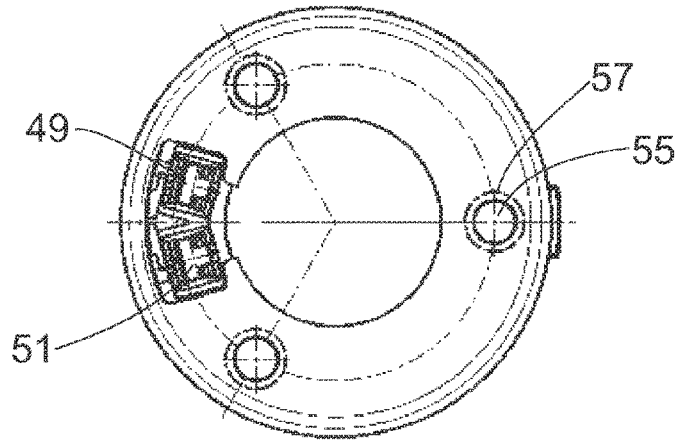
Figure 5:
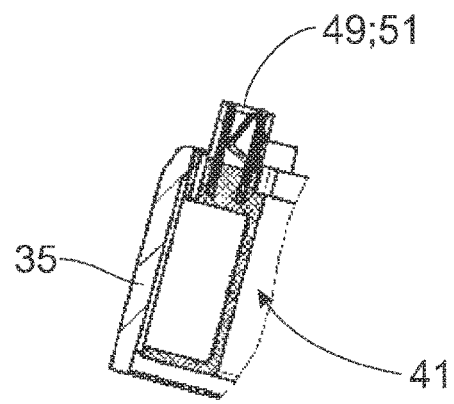

FIG. 2 shows the damping valve device 27 in a sectional view. The damping valve device 27 comprises a damping valve housing 31 with a tube part 33 which is arranged so as to be substantially stationary with respect to the reservoir tube 17. A coil assembly 37 is arranged in a top housing part 35 as part of the damping valve housing 31. This coil assembly 37 is axially supported on an intermediate housing wall 39 and comprises a coil carrier 41 which has a tube portion 43 with annular covers 45; 47 at the ends as can be seen from FIGS. 3 to 5. A first annular cover 45 has two contacts 49, 51 at the ends of a coil 53 which is wound on the coil carrier 41. Further, three fastening pins 55, for example, are formed at the first annular cover 45, which fastening pins 55 extend through the outer housing part 35 through three receiving openings 57. The coil carrier 41 is preferably made from plastic and, along with the top housing part 35, forms a retaining connection 59 in that the fastening pins 55 are axially upset and accordingly radially close the receiving openings 57 on the top side, i.e., functionally form a kind of rivet. A definitive positioning of the coil assembly 37 inside the outer top housing part 35 is ensured via the retaining connection 59.

Figure 6:
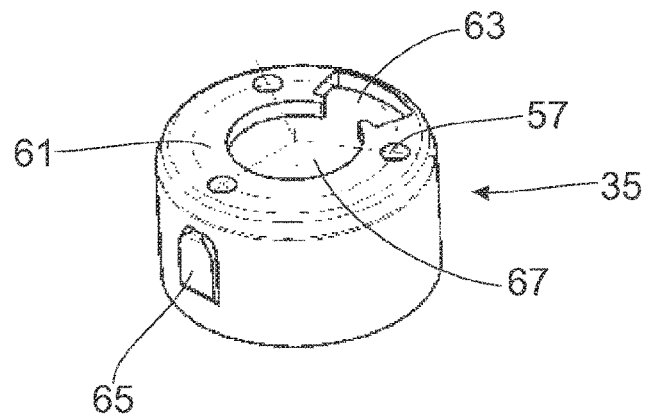
FIGS. 6-8 are perspective, cross-sectional and top views of the outer top housing part of the present invention as an individual part.
Figure 7:
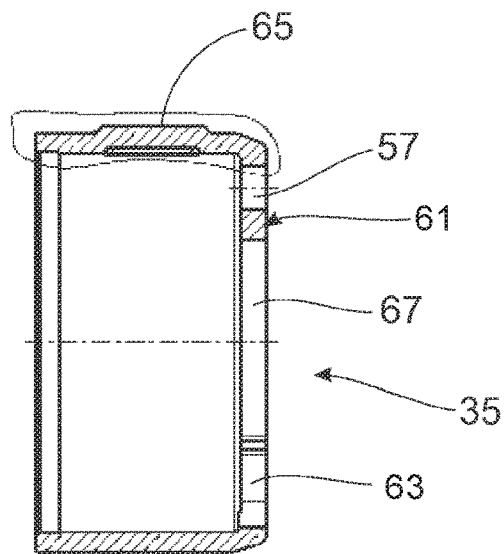
Figure 8:
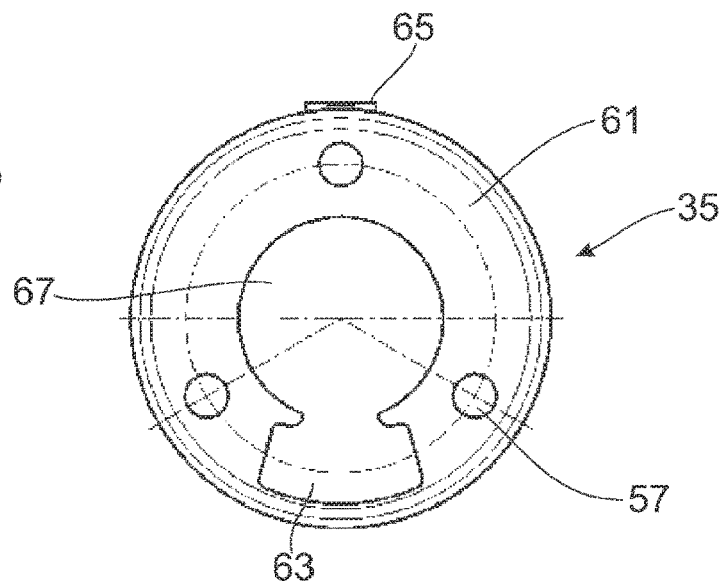

FIGS. 6 to 8 show the construction of the outer top housing part 35. The top housing part 35 has a pot shape with a base 61 which has the receiving openings 57. Further, a cutout 63 is made for the contacts 49; 51 of the coil assembly 37. FIGS. 6 and 7 show a radial widening 65 in some area of the top housing part 35.

A central opening is used to guide through an inner sleeve 69 with a base 71. As is shown in FIG. 2, the inner sleeve 69 is connected to the intermediate housing wall 39 in a pressure-tight manner. The intermediate housing wall 39 with the inner sleeve 69 and the base 71 separate a valve region 73 from the coil assembly 37 and the outer top housing part 35. The inner sleeve 69 and the base 71 receive an armature 75 via which a pre-stage valve 77 is actuated, this pre-stage valve 77 acting on a main stage valve 79. As is further shown in FIG. 2, the inner sleeve 69 comprises two functional portions. The base 71 and an adjoining inner sleeve portion 81 are made from a material with a low magnetic reluctance. An insulating sleeve 83 as part of the inner sleeve 69 has an appreciably greater magnetic reluctance so as to let the magnetic flux of the coil 53 flow through the armature 75 with the highest possible efficiency. The outer top housing part 35 forms a back iron body in the magnetic flux of the coil 53.

The intermediate housing wall 39 is also preferably constructed of a plurality of parts and comprises a stepped sleeve 85 and a base 87 which is oriented in direction of the armature 75. The basic construction of the armature 75, pre-stage valve 77 and main stage valve 79 is already known, for example, from DE 10 2013 209 926 A1, the entire content of which is hereby incorporated herein by reference.

A lateral surface portion 89 of the intermediate housing wall 39 forms a press fit with an end region 91 of the inner wall of the outer top housing part 35 such that a preassembled structural unit comprising coil assembly 37 and outer top housing part 35 can be fixed to the intermediate housing wall 39.

FIG. 2 further shows a protective cap 93 which is separate from the top housing part 35. This protective cap 93 covers the outer top housing part 35. The protective cap 93 has a power supply connection 95 which is connected to a counter-contact 97 of the protective cap 93. The counter-contact 97 of the protective cap 93 and the contacts 49; 51 of the coil assembly 37 are constructed such that they can be coupled.

As can be seen in the right-hand half of the sectional diagram, the protective cap 93 has an axial receiving groove 99 for the radial widening 65 of the outer top housing part 35. The receiving groove 99 and the radial widening 65 form a positive engagement device for preventing rotation between the protective cap 93 and the outer top housing part 35. In this way, a definitive orientation of the power supply connection 95 relative to the damping valve device 27 can be produced.

The intermediate housing wall 39 is fixedly connected to the tube part 33, e.g., by means of a radial bead 101. A seal 103 prevents damping liquid from exiting the valve region 73 into the environment. Also, in case of a bead 101 which is already closed, the outer top housing part 35 can be removed from the intermediate housing wall 39.

The protective cap 93 comprises a base 109 which is axially supported on the base 71 of the inner sleeve 69. The base 71 of the inner sleeve 69 is constructed in some areas as hollow pin-shaped fastening element 107 which projects through a passage 109 of the protective cap 93, and a separate fastening element 111 enters into a fixing connection with the base 71 of the inner sleeve 69 and the pin-shaped fastening element 107. Accordingly, the protective cap 93 is fixed relative to the base 71 of the inner sleeve 69 which is in turn fixedly connected to the intermediate housing wall 39. The small radial and axial distance between the contact and counter-contact and the fastening elements 107; 111 can be seen. In this way, the contact/counter-contact is subjected to practically no relative movements of the protective cap 93 with respect to the inner sleeve.

The fastening element 111 has a hat-shaped cross section and accordingly covers the passage 109 in the protective cap 93. Optionally, a seal 113 can be associated with the passage 109 in addition such that the contact region between the protective cap 93 and the base 71 of the inner sleeve 69 is also sealed.

The protective cap 93 does not protect only the region of the outer top housing part 35 and the inner component parts thereof. A tube extension 115 of the protective cap 93 axially overlaps the tube part 33. Optionally, at least one seal 117 can be arranged between the inner wall of the tube extension 115 and the tube part 33 such that the transitional area between the outer top housing part 35 and the intermediate housing wall 39 is also covered and accordingly protected against dirt and moisture.

The assembly of the damping valve device 27 is carried out basically in the following manner. In a first step, the entire inner sleeve 69 is connected to the stepped sleeve 85, e.g., by a soldering process. When this constructional unit is held vertically with the bottom facing downward, the armature 75, including spring arrangement 119, can be inserted into the inner sleeve 69. Afterwards, the base 87 of the intermediate housing wall 39 is fixed to the stepped sleeve 85. The pre-stage valve 77 and main stage valve 79 are then installed. A partial deformation 121 at the inner wall of the stepped sleeve 85 can axially fix the main stage valve 79 and, therefore, also the pre-stage valve 77.

Figure 3:
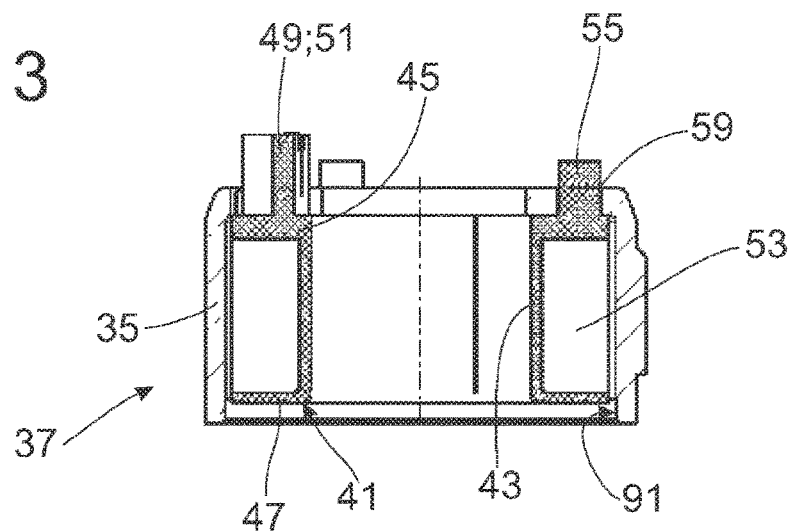
FIGS. 3-5 are cross-sectional, top and partial cross-sectional views of a coil assembly of the present invention with outer top housing part.

At the same time, the coil assembly 37 can be guided into the outer top housing part 35. Because of the geometric arrangement of the fastening pins 55, there is only one individual assembly position in circumferential direction. FIG. 3 shows the finished subassembly. The contact 49; 51 of the coil assembly 37 extends through the outer top housing part 35, and the coil assembly 37 contacts the inner side of the base 61 of the outer top housing part 35. The axially projecting end region 91 is between the lower annular cover 47 and the top housing part 35.

The subassembly according to FIG. 3 is subsequently pushed onto the intermediate housing wall 39 with the inner sleeve 69 until the coil assembly 37 contacts the intermediate housing wall 39 and the end region 91 of the outer top housing part 35 enters the press fit with the intermediate housing wall 39. In this construction step, the damping valve device 27 with the coil assembly 37, which is also utilized in real use, can be tested and, if necessary, also dismantled so as to readjust or exchange parts as the case may be.

The damping valve device 27 inserted into the tube part 33 is then oriented and, e.g., provided with beading, in circumferential direction according to the desired position of the power supply connection 95. In a next work step, the protective cap 93 with seal 117 is fitted, and the counter-contact 97 engages in the contact 49; 51 of the coil assembly 37. A faulty assembly is ruled out due to the fact that rotation between the protective cap 93 and the outer top housing part 35 is prevented.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve device, comprising:
   a damping valve housing (31) including a tube part (33) and an outer top housing part (35);
   a coil assembly (37);
   a valve region (73) and an inner sleeve (69) having a base (71) for closing said valve region (73);

an intermediate housing wall (39) fixed with respect to said tube part (33) and spatially separating said coil assembly (37) from said valve region (73);

said outer top housing part (35) forming a back iron body for said coil assembly (37);

said outer top housing part (35) being a component part separate from said intermediate housing wall (39);

said inner sleeve (69) being connected to said intermediate housing wall (39) in a pressure-tight manner independent from said outer housing part (35); and a protective cap (93) which is a separate component part from said outer top housing part (35) constructed to cover said outer top housing part (35), said protective cap comprising a tube extension (115) which axially overlaps said tube part (33).

2. The damping valve device according to claim 1, wherein said coil assembly (37) comprises a contact (49; 51) which can be coupled with a counter-contact (97) of said protective cap (93), and wherein said protective cap (93) comprises a power supply connection (95).

3. The damping valve device according to claim 1, wherein said coil assembly (37) comprises a positioning connection to said outer top housing part (35).

4. The damping valve device according to claim 1, wherein said outer top housing part (35) is constructed for preventing rotation with respect to said protective cap (93).

5. The damping valve device according to claim 1, wherein said outer top housing part (35) comprises a retaining connection (59) with said coil assembly (37).

6. The damping valve device according to claim 1, wherein said outer top housing part (35) comprises at least one receiving opening (57) for a fastening pin (55) of said coil assembly (37).

7. The damping valve device according to claim 1, wherein said protective cap and said inner sleeve each comprise a base, and wherein said intermediate housing wall (39) is connected to said tube part (33).

8. The damping valve device according to claim 1, wherein said protective cap and said inner sleeve each comprise a base, and wherein said base (105) of said protective cap (93) is supported on said base (71) of said inner sleeve (69).

9. The damping valve device according to claim 1, additionally comprising a fastening element (111), and wherein said protective cap (93) is fixed at said base (71) of said inner sleeve (69) by said fastening element (111).

10. The damping valve body according to claim 9, wherein said base (105) of said protective cap (93) comprises a passage (109) through which said base (71) of said inner sleeve (69) projects; and wherein said fastening element (111) enters into a fixing connection with said base (71) of said inner sleeve (69).

11. The damping valve device according to claim 10, wherein said fastening element (111) comprises a hat-shaped cross section.

12. The damping valve device according to claim 10, additionally comprising a seal (113) associated with said passage (109).

13. The damping valve device according to claim 1, additionally comprising at least one seal (117) arranged between an inner wall of said tube extension (115) and said tube part (33).

* * * * *